(12) United States Patent
Kim

(10) Patent No.: US 7,483,967 B2
(45) Date of Patent: Jan. 27, 2009

(54) SCALABLE SERVER ARCHITECTURE BASED ON ASYMMETRIC 3-WAY TCP

(75) Inventor: Han-gyoo Kim, Irvine, CA (US)

(73) Assignee: Ximeta Technology, Inc. (VG)

( * ) Notice: Subject to any disclaimer, the term of this patent is extended or adjusted under 35 U.S.C. 154(b) by 600 days.

(21) Appl. No.: 10/829,399

(22) Filed: Apr. 22, 2004

(65) Prior Publication Data
US 2006/0155805 A1 Jul. 13, 2006

Related U.S. Application Data

(63) Continuation-in-part of application No. 09/650,644, filed on Aug. 30, 2000, now abandoned.

(30) Foreign Application Priority Data
Sep. 19, 1999 (KR) ............................... 1999-36874

(51) Int. Cl.
*G06F 15/173* (2006.01)
(52) U.S. Cl. .................. 709/223; 709/224; 709/203; 709/227; 370/401; 370/466
(58) Field of Classification Search ................ 709/230, 709/203, 238, 227, 223, 224; 370/392, 401, 370/466, 469
See application file for complete search history.

(56) References Cited

U.S. PATENT DOCUMENTS 5,329,619 A 7/1994 Pagé
5,426,427 A 6/1995 Chinnock et al.
5,463,772 A 10/1995 Thompson et al.
5,513,314 A 4/1996 Kandasamy et al.
5,524,247 A 6/1996 Mizuno
5,566,331 A 10/1996 Irwin et al.
5,721,818 A 2/1998 Hanif et al.

(Continued)

FOREIGN PATENT DOCUMENTS

DE 19610840 9/1997

(Continued)

OTHER PUBLICATIONS

Blunden et al., "Storage Network Virtualization: What's it all about?", ibm.com/redbooks, XP-002286341, pp. 1-110, Dec. 2000.

(Continued)

*Primary Examiner*—Lashonda T Jacobs
(74) *Attorney, Agent, or Firm*—Dorsey & Whitney LLP

(57) ABSTRACT

A server architecture based on asymmetric 3-way TCP (ATCP) is disclosed that can distribute the work among multiple processors. In particular, the server system has a front-end server receiving a service request from a client. The server system also has a back-end server that receives a command from the front-end server. The back-end server sends the result back directly to the client in a pseudo packet that looks like a packet sent from the front-end server. The pseudo packet has the IP address and the port number of the front-end server. A scalable system is achieved because the bottleneck through the front-end server is avoided.

19 Claims, 12 Drawing Sheets

U.S. PATENT DOCUMENTS

| | | | |
|---|---|---|---|
| 5,774,660 A | 6/1998 | Brendel et al. | |
| 5,781,550 A * | 7/1998 | Templin et al. | 370/401 |
| 5,812,930 A | 9/1998 | Zavrel | |
| 5,838,916 A | 11/1998 | Domenikos et al. | |
| 5,889,942 A | 3/1999 | Orenshteyn | |
| 5,987,523 A | 11/1999 | Hind et al. | |
| 5,987,627 A | 11/1999 | Rawlings, III | |
| 5,999,808 A | 12/1999 | Ladue | |
| 6,047,307 A | 4/2000 | Radko | |
| 6,085,234 A | 7/2000 | Pitts et al. | |
| 6,128,644 A | 10/2000 | Nozaki | |
| 6,128,690 A | 10/2000 | Purcell et al. | |
| 6,167,490 A | 12/2000 | Levy et al. | |
| 6,175,869 B1 | 1/2001 | Ahuja et al. | |
| 6,216,202 B1 | 4/2001 | E'Errico | |
| 6,314,465 B1 | 11/2001 | Paul et al. | |
| 6,317,775 B1 | 11/2001 | Coile et al. | |
| 6,327,594 B1 | 12/2001 | Van Huben et al. | |
| 6,345,300 B1 | 2/2002 | Bakshi et al. | |
| 6,347,095 B1 | 2/2002 | Tang et al. | |
| 6,356,915 B1 | 3/2002 | Chrchetkine et al. | |
| 6,360,265 B1 | 3/2002 | Falck et al. | |
| 6,366,988 B1 | 4/2002 | Skiba et al. | |
| 6,389,432 B1 | 5/2002 | Pothapragada et al. | |
| 6,393,569 B1 | 5/2002 | Orenshteyn | |
| 6,404,766 B1 | 6/2002 | Kitai et al. | |
| 6,421,753 B1 | 7/2002 | Hoese et al. | |
| 6,449,647 B1 | 9/2002 | Colby et al. | |
| 6,470,389 B1 | 10/2002 | Chung et al. | |
| 6,510,164 B1 | 1/2003 | Ramaswamy et al. | |
| 6,518,965 B2 | 2/2003 | Dye et al. | |
| 6,523,066 B1 | 2/2003 | Montroy et al. | |
| 6,529,996 B1 | 3/2003 | Nguyen et al. | |
| 6,539,446 B1 | 3/2003 | Chan | |
| 6,578,111 B1 | 6/2003 | Damron et al. | |
| 6,594,677 B2 | 7/2003 | Davis et al. | |
| 6,598,068 B1 | 7/2003 | Clark | |
| 6,609,167 B1 | 8/2003 | Bastiani et al. | |
| 6,647,016 B1 | 11/2003 | Isoda et al. | |
| 6,701,370 B1 * | 3/2004 | Dillon | 709/230 |
| 6,732,104 B1 | 5/2004 | Weber | |
| 6,760,783 B1 | 7/2004 | Berry | |
| 6,775,704 B1 * | 8/2004 | Watson et al. | 709/229 |
| 6,807,581 B1 | 10/2004 | Starr et al. | |
| 6,823,458 B1 | 11/2004 | Lee et al. | |
| 6,834,326 B1 | 12/2004 | Wang et al. | |
| 6,894,981 B1 * | 5/2005 | Coile et al. | 370/248 |
| 6,941,576 B2 | 9/2005 | Amit | |
| 7,010,303 B2 | 3/2006 | Lewis et al. | |
| 7,069,312 B2 | 6/2006 | Kostic et al. | |
| 7,069,350 B2 | 6/2006 | Fujita et al. | |
| 7,076,690 B1 | 7/2006 | Todd et al. | |
| 7,114,083 B2 * | 9/2006 | Devine et al. | 713/152 |
| 7,124,128 B2 | 10/2006 | Springer, Sr. et al. | |
| 7,133,361 B2 * | 11/2006 | Olariu et al. | 370/230 |
| 7,249,191 B1 * | 7/2007 | Hutchison et al. | 709/236 |
| 7,251,704 B2 | 7/2007 | Solomon et al. | |
| 7,254,578 B2 | 8/2007 | Devarakonda et al. | |
| 7,277,955 B2 | 10/2007 | Elliott | |
| 7,376,133 B2 | 5/2008 | Gettala et al. | |
| 7,383,229 B2 | 6/2008 | Jacoby | |
| 2001/0029544 A1 * | 10/2001 | Cousins | 709/233 |
| 2002/0069245 A1 | 6/2002 | Kim | |
| 2002/0104017 A1 * | 8/2002 | Stefan | 713/201 |
| 2003/0014569 A1 | 1/2003 | Kim | |
| 2003/0018403 A1 | 1/2003 | Braun et al. | |
| 2003/0028614 A1 | 2/2003 | Jeon | |
| 2003/0172149 A1 | 9/2003 | Edsall et al. | |
| 2003/0225834 A1 | 12/2003 | Lee et al. | |
| 2004/0068563 A1 | 4/2004 | Ahuja et al. | |
| 2004/0117813 A1 | 6/2004 | Karaoguz et al. | |
| 2004/0220933 A1 | 11/2004 | Walker | |
| 2005/0042591 A1 | 2/2005 | Bloom et al. | |
| 2005/0110768 A1 | 5/2005 | Marriott et | |
| 2005/0149682 A1 | 7/2005 | Kim | |
| 2005/0193017 A1 | 9/2005 | Kim | |
| 2005/0193189 A1 | 9/2005 | Kim | |
| 2006/0004935 A1 | 1/2006 | Seto et al. | |
| 2006/0010287 A1 | 1/2006 | Kim | |
| 2006/0045130 A1 | 3/2006 | Kim | |
| 2006/0067356 A1 | 3/2006 | Kim | |
| 2006/0069884 A1 | 3/2006 | Kim | |
| 2007/0008988 A1 | 1/2007 | Kim | |

FOREIGN PATENT DOCUMENTS

| | | |
|---|---|---|
| DE | 10038142 | 2/2001 |
| JP | 10-113469 | 5/1998 |
| JP | 10-271562 | 10/1998 |
| JP | 11007404 | 1/1999 |
| JP | 11-114224 | 4/1999 |
| KR | 10-2000-72493 | 12/2000 |
| KR | 10-2001-0088528 | 9/2001 |
| WO | WO99/03297 | 7/1999 |
| WO | WO00/29529 | 5/2000 |

OTHER PUBLICATIONS

Klein, Yaron, "Storage Virtualization with iSCSI Protocol", Internet Draft, XP-015030964, pp. 1-15, Nov. 2, 2000.

Schulz, Greg, "SAN and NAS; Complementary Technologies", http://www.mti.com/white_papers/WP20002.pdf, XP-002201566, pp. 1-7, May 1, 2000.

Japanese Office Action, App. No. 555298/2002, Jan. 9, 2007.

Japanese Office Action, App. No. 513300/2003, Feb. 6, 2007.

* cited by examiner

SCALABLE SERVER ARCHITECTURE BASED ON ASYMMETRIC 3-WAY TCP

This application is a Continuation-In-Part of application Ser. No. 09/650,644 field on Aug. 30, 2000 now abandoned.

FIELD OF THE INVENTION

This invention relates to client-server network processing. More specifically, this invention relates to a server architecture based on asymmetric 3-way TCP.

BACKGROUND OF THE INVENTION

Computers on the Internet communicate with each other by sending packets according to a standard protocol suite including the TCP/IP (Transmission Control Protocol and Internet Protocol) suite.

As the usage of Internet increases, high-performance web servers or mail servers are desired that can accommodate ever-increasing service requests from many clients. Especially, what is desired is a scalable server system whose handling capacity can increase in proportion to the frequency of service requests from clients.

One way to implement such a scalable server system is to employ a high-performance single-processor server. But, this is not an economically desirable solution because one must pay a stiff price for such a single-processor high-performance system. Another way is to employ multiple servers to distribute service requests from clients. However, adding servers does not necessarily translate to increased performance because the existing protocol limits handling of service requests to only those servers specified by the clients, thereby creating a bottleneck.

Therefore, there is a need for a scalable server architecture whose performance is proportional to the client's demand.

U.S. Pat. No. 5,774,660, issued to Brendel et al. on Jun. 30, 1998, discloses a load balancer operating in a TCP/IP environment. As shown in FIGS. 10, 11A, 11B, 12, and 17 of U.S. Pat. No. 5,774,660, the load balancer and a server establish a TCP playback, i.e., TCP/connection, before the load balancer relays a packet received from a client to the server. In order to establish such a connection, each of the load balancer and the server should have a TCP/IP stack. As described above, the load balancer (i.e., a front-end server) and the server (i.e., a back-end server) establish a TCP connection so that the TCP connection between a browser (i.e., the client) and the load balancer is transferred to the TCP connection between the browser and the server. The load balancer then transfers the TCP/IP connection and a current TCP state to an assigned server (i.e., the back-end server), using TCP state migration. TCP state migration is not simply forwarding packets through as they are received. Instead the packets received are stored by the load balancer and then played back to the assigned server.

However, a service request, which is received by the load balancer, is not processed by the assigned server by sending the service request to the assigned server in a data link frame such as an Ethernet frame, without establishing a TCP/IP connection between the front-end server and the back-end server.

Therefore, there is a need for a scalable server architecture whose performance is performed without establishing a TCP/IP connection between the front-end server and the back-end server.

SUMMARY OF THE INVENTION

An object of the present invention is to provide a scalable server system whose performance does not degrade with the increased frequency of the client service requests.

Another object of the present invention is to provide a server system that can distribute service requests from a client over multiple processors to increase the performance.

In accordance with one aspect of the present invention, there is provided a server system for processing a service request from a client in a network processing environment, which comprises a front-end server and at least one back-end server connected through a data link. The front-end server receives a service request from the client and generates a data link containing a service command necessary to perform the service request. The back-end server connected to the front-end server through the data link receives the data link frame containing the service command and executes the service command and sends directly the result of the service command to the client in a pseudo packet bypassing the front-end server. The client then recognizes the pseudo packet bearing the result of the service command as a packet originating from the front-end server.

In accordance with another aspect of the present invention, there is provided a method for processing a service request from a client in a network processing environment. The method comprises the steps of receiving a service request from the client by a front-end server, processing the service request by a back-end server connected to the front-end server through a data link, without establishing a TCP/IP connection, and providing the processed result to the client directly by the back-end server in a pseudo TCP packet bypassing the front-end server.

In accordance with still another aspect of the present invention, there is provided a method for processing a service request from a client in a network processing environment. The method comprises the steps of receiving a service request from the client by a front-end server, processing the service request by a back-end server connected to the front-end server through a data link, without establishing a TCP/IP connection, and providing the processed result to the client directly by the back-end server in a pseudo UDP packet bypassing the front-end server.

In accordance with yet another aspect of the present invention, there is provided a computer-readable medium containing a computer program. The computer program comprises the steps of receiving a service request from the client by a front-end server, processing the service request by a back-end server connected to the front-end server through a data link without establishing a TCP/IP connection, and providing the result to the client by the back-end server bypassing the front-end server.

The foregoing and other objects and aspects are accomplished by providing an asymmetric 3-way TCP (ATCP) scheme that includes a front-end server and a back-end server, both communicating with a client. The front-end server receives a service request from the client and sends a service command contained in a data link frame necessary to process the service request to the back-end server through a data link. The back-end server executes the service command contained in the data link frame and sends the result back directly to the client in a pseudo TCP packet which would be recognized by the client as being sent by the front-end server. The pseudo TCP packet has the IP address and the port number of the front-end server to look like a packet sent by the front-end server.

BRIEF DESCRIPTION OF THE DRAWINGS

The above and other objects and features of the present invention will become apparent from the following description of preferred embodiments given in conjunction with the accompanying drawings.

DETAILED DESCRIPTION OF THE PRESENT INVENTION

Figure 1:
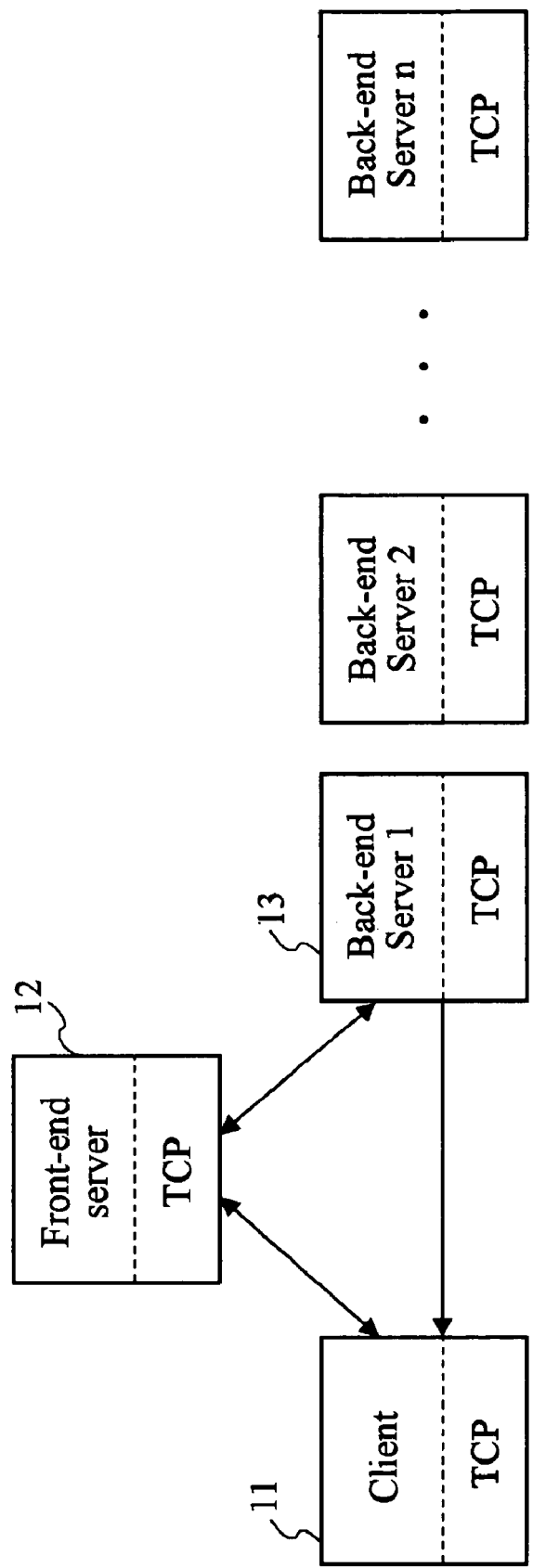
FIG. 1 is an illustration of an asymmetric 3-way TCP (ATCP) scheme of the present invention.

FIG. 1 illustrates the operations of a client-server system based on an asymmetric TCP (ATCP) of the present invention. The system has a client 11 communicating with a front-end server 12 and a back-end server 13. The operations may be summarized as follows:

(1) The client makes a service request to the front-end server through the socket of the front-end server whose TCP connection is specified by the client. Note that the client does not specify any connection with the back-end server and does not even know the presence of the back-end server.

(2) The front-end server relays the service request received from the client to the back-end servers through a data link together with the source/destination port numbers and source/destination IP addresses and the acknowledge number expected by the client and the sequence number of the TCP packet that would contain the result of the service request. The front-end server may simply relay the client's request to the back-end server or sends a specific command after decoding a request and generating a data link frame containing the specific command. If the front-end server directly handles the client's service request, the front-end server would send the result to the clients through a conventional TCP packet.

(3) The back-end server, which is connected to the front-end server through the data link, without establishing a TCP/IP connection, sends a TCP packet containing the service result to the client through the client's socket. Although the TCP packet is made by the back-end server, the packet is disguised as if it were sent by the front-end server by using the destination/source sockets specified by the client and the front-end server. For this reason, the TCP packet sent by the back-end server is referred to as a "pseudo TCP packet."

(4) The client sends a TCP packet responding to the service received to the front-end server and sends a further service request to the front-end server, if necessary.

Figure 2:
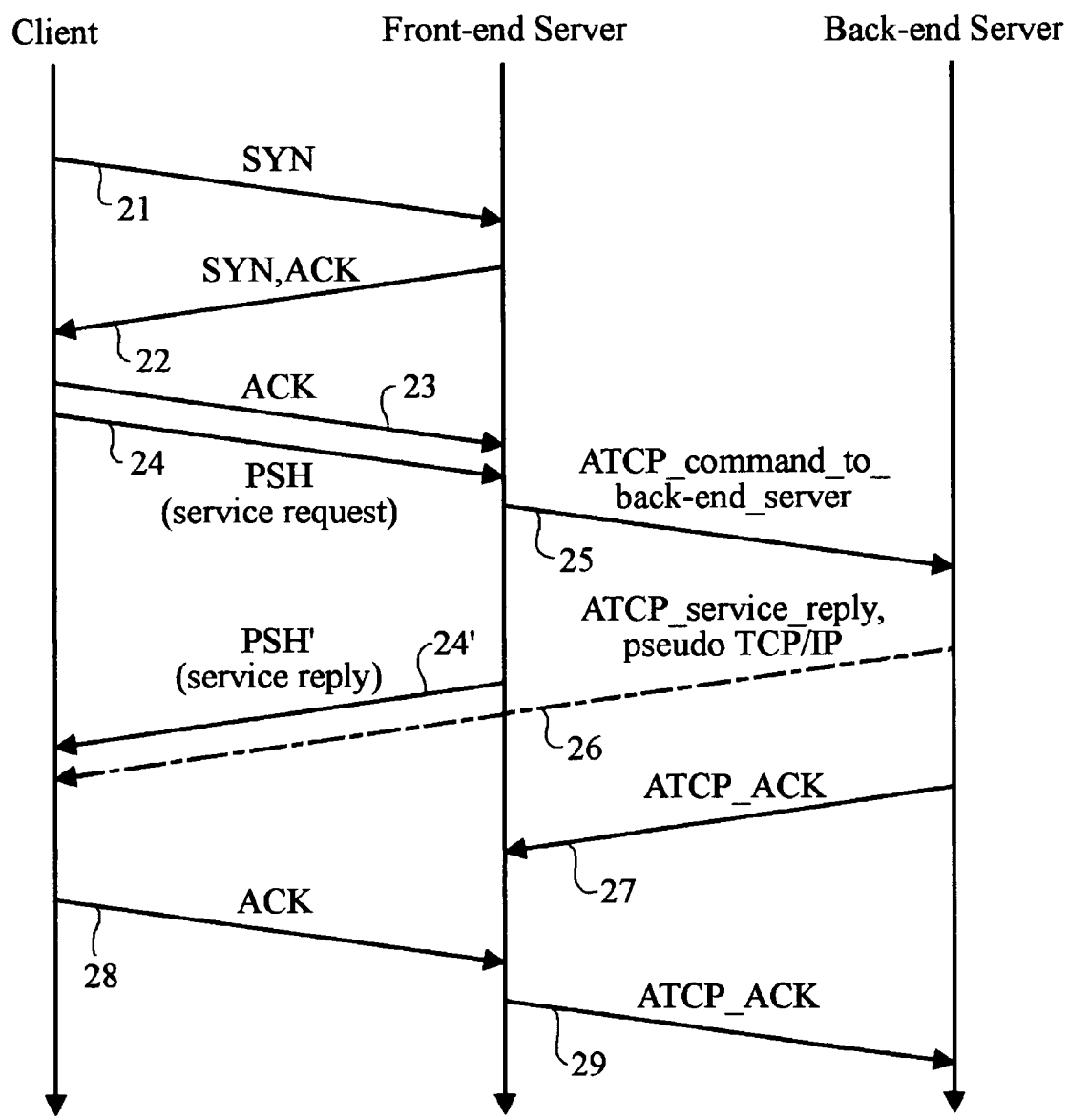
FIG. 2 is a schematic diagram of the ATCP of the present invention.

FIG. 2 shows a schematic diagram of the TCP and ATCP packets exchanged between the client, the front-end server, and the back-end server.

(a) SYN 21, SYN ACK 22, ACK 23 are conventional TCP packets for handshaking between the client and the front-end server to establish a TCP connection. PSH 24 is a conventional TCP packet containing a service request from the client to the front-end server.

(b) PSH' 24' is a conventional TCP packet that would have been generated by the front-end server to send the front-end server's reply to the service request. However, in the present invention, PSH' 24' is not generated. Instead, the front-end server relays the service request to the back-end server so that the reply to the service requests is handled by the back-end server. By using multiple back-end servers, the front-end server can distribute the processing among multiple processors, thereby enabling a high-performance server system.

(c) ATCP_command_to_back-end_server 25 of the present invention is not a conventional TCP packet, but an ATCP packet containing a service command sent from the front-end server to the back-end server through the data link, the source/destination IP addresses of the client requesting the service, the port number of the client, the acknowledgement number expected by the client, and the sequence number expected by the client.

(d) The back-end server, receiving a service command from the front-end server through ATCP_command_to_back-end_server 25, processes the command and sends the result directly to the client in ATCP_service_reply 26. For ATCP_service_reply 26 to be recognized by the client process through the client's TCP layer, the ATCP_service_reply packet must look as if it were sent by the front-end server. This is accomplished by making the destination port number of the ATCP packet 26 assigned the client's port number and the source port number of the ATCP packet assigned the front-end server's port number. The destination port number and the acknowledgement number of the ATCP_service_reply packet 26 are assigned the sequence number and the acknowledgement number received through the ATCP_command_to_back-end_server 25 packet.

(e) After sending ATCP_service_reply 26 to the client, the back-end server sends an acknowledgement to the front-end server through ATCP_ACK 27. Without this acknowledgement, the front-end server has no way of knowing whether the back-end server correctly has processed the command.

(f) The TCP layer of the front-end server sets the acknowledgement number expected from the client as the sequence number sent to the back-end server plus the size of data sent to the client by the back-end server.

(g) Receiving ATCP_service_reply 26, the client recognizes it as a packet received by the front-end server and sends an acknowledgement ACK 28, a conventional TCP packet containing an acknowledgement number, to the front-end server. The acknowledgement number would be equal or less than the acknowledgement number expected by the front-end server because the front-end server already updated the expected acknowledgement number in step (f). If the expected acknowledgement number had not been updated in step (f), a TCP packet having the response larger than the expected number would have been discarded.

(h) Receiving ACK 28, the ATCP of layer of the front-end server sends a response ATCP_ACK 29 if the acknowledgment number received is equal or less than the expected acknowledgement number.

(i) Receiving ATCP_ACK 29, the ATCP layer of the back-end server empties the buffer by the received amount. Since the front-end server and the back-end server of present invention cooperate each other with respect to the acknowledgement number without disturbing other TCP services, ATCP_ACK 29 is treated similar to a TCP packet.

The front-end server relays the TCP packet received from the client through the established connection between the client and the front-end server. Note, however, that the back-end server need not and does not establish a TCP connection with the client because the back-end server sends the result in a pseudo TCP packet that would look like a TCP packet sent from the front-end server. In fact, the client does not even know of the presence of the back-end servers.

The packets exchanged by the front-end server and back-end server need not be a TCP packet or of the same format as a TCP packet as long as the packets support a connection-oriented service.

Figure 3:
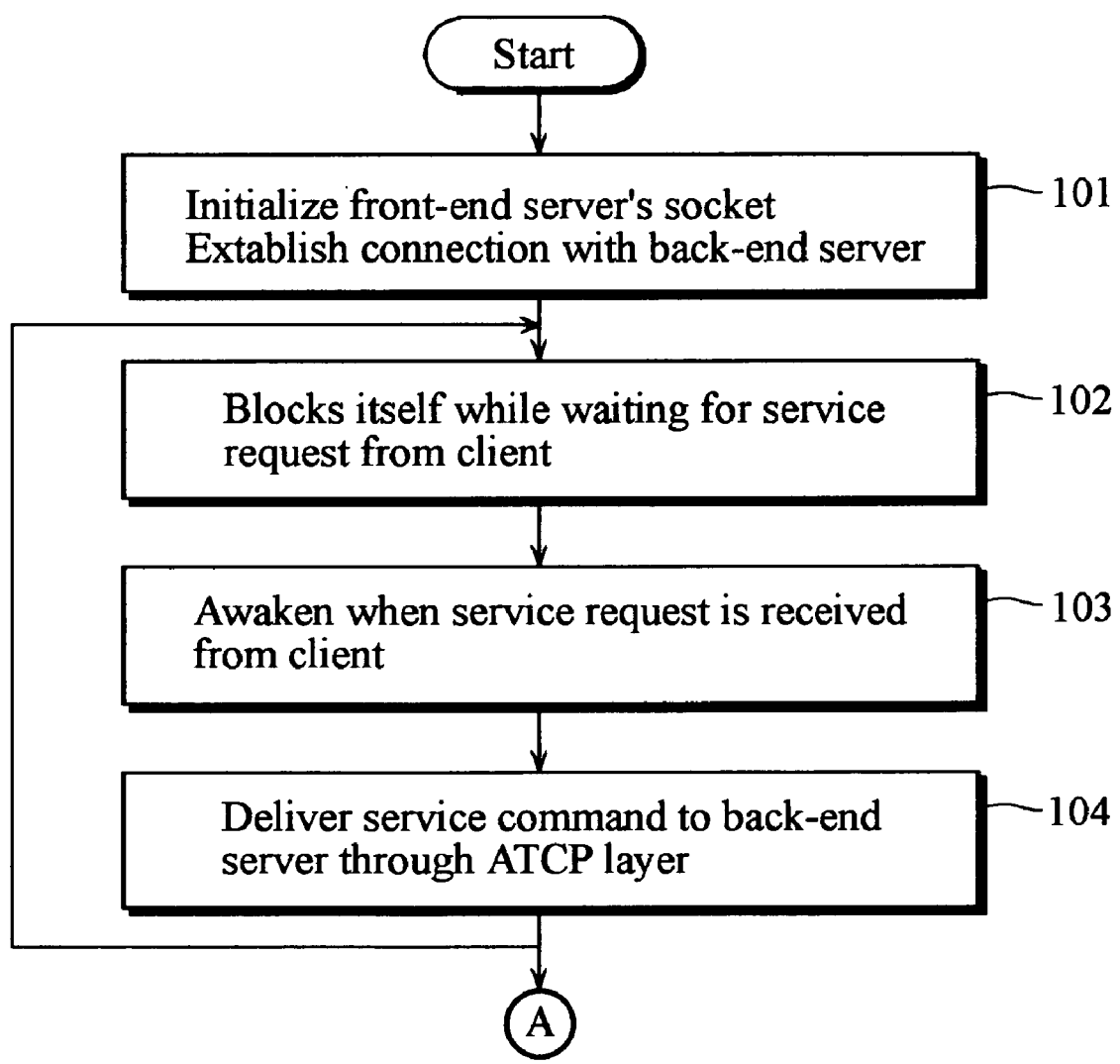
FIG. 3 is a flowchart of a software routine run at the front-end server.

FIG. 3 is a flowchart of a software routine run at the front-end server. The process at the front-end server first initializes the socket connection with the back-end server (step 101), and blocks itself while waiting a service request from a client (step 102). When a service request is received from a client, the process at the front-end server is awakened, and the process delivers a service command contained in a data link frame to the back-end server through the ATCP layer. The process at the front-end server repeats steps 102-104. Processing point (A) represents the point in time when the process run at the front-end server sends a command to the back-end server through the ATCP layer.

Figure 4:
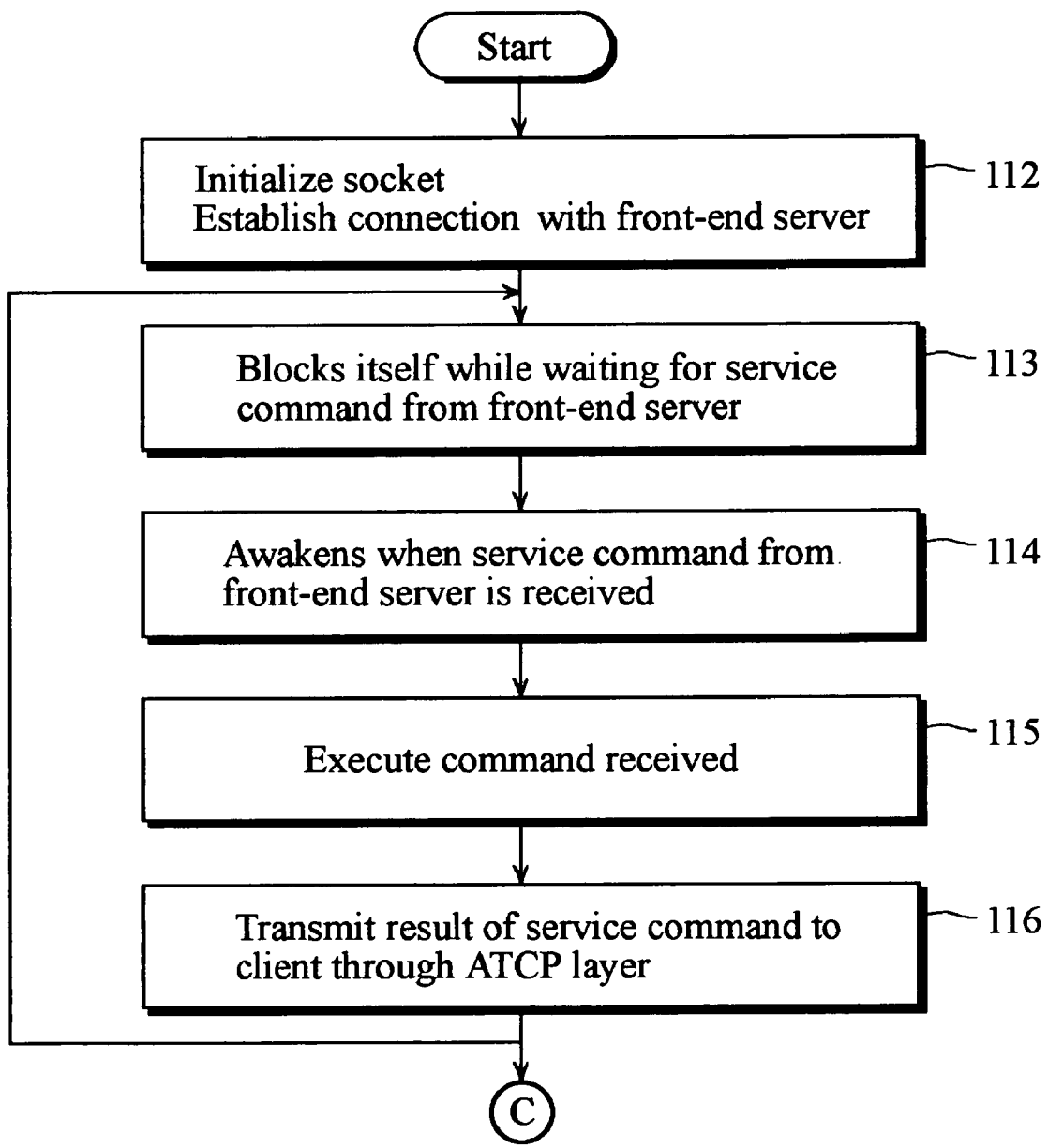
FIG. 4 is a flowchart of a software routine run at the back-end server.

FIG. 4 is a flowchart of a software routine run at the back-end server. The process run at the back-end server first initializes the socket connection (step 112) and blocks itself while waiting for a command from the front-end server (step 113). The process is awakened when ATCP_command_to-back-end_server 25, a pseudo TCP packet containing a command from the front-end server, is sent to the ATCP level of the back-end server (step 114).

Please note that there is no need for a TCP stack at the back-end server because the back-end server receives a special command from the front-end server rather than a full TCP packet.

After executing the command received from the front-end server (step 115), the process incorporates the service result into a pseudo TCP packet and send it to the client, not to the front-end server, and blocks itself waiting for a next command. The process at the back-end server repeats the above steps (steps 113-116). Processing point (C) represents the point in time when the command is delivered from the back-end server software to the ATCP level at the back-end server through the API such as a socket.

Figure 5:
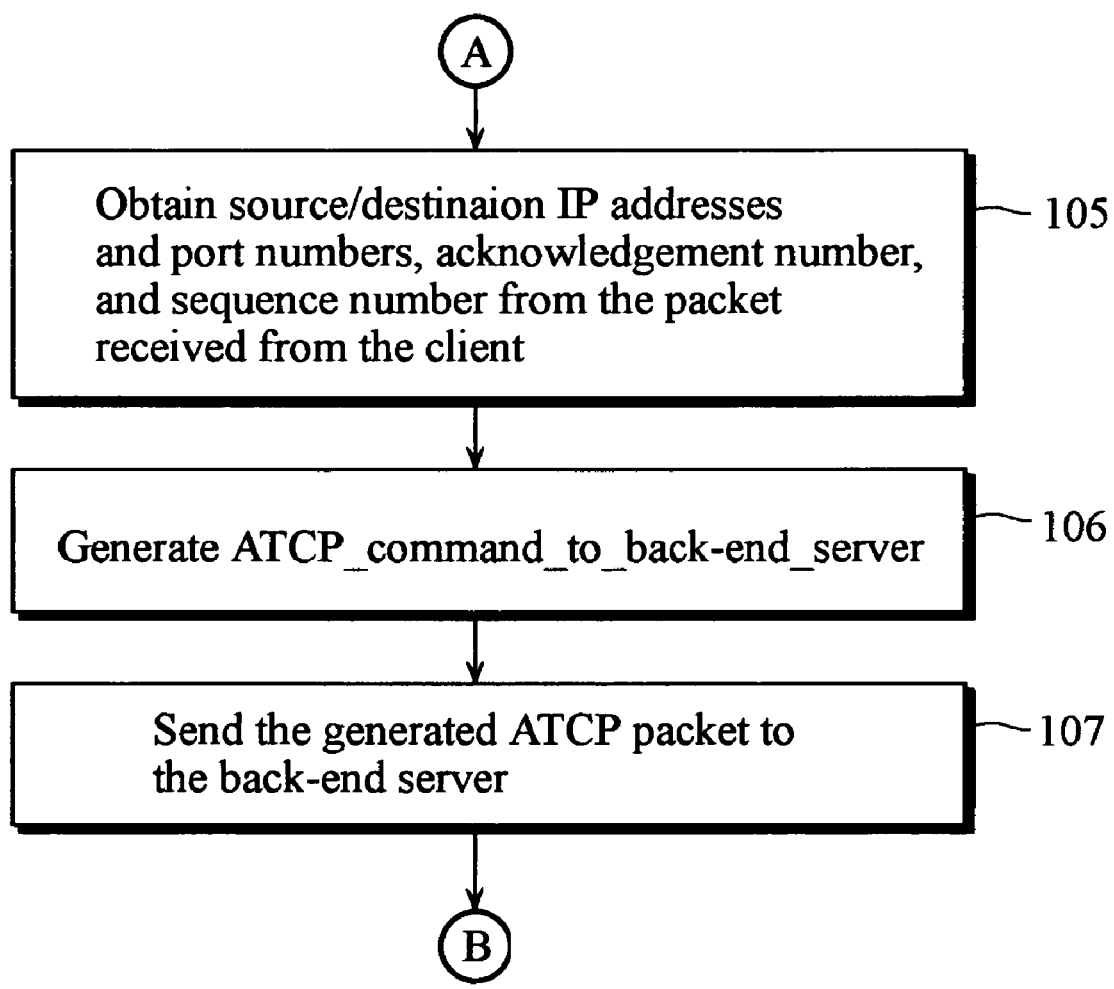
FIG. 5 is a flowchart of a software routine run by the front-end server to send a service command the back-end server through an ATCP_command_back-end_server packet.

FIG. 5 is a flowchart of a software routine run at the front-end server after step (A). The process run at the front-end server obtains the source/destination IP addresses of the client requesting the service, the source/destination port numbers, the acknowledgement number, and the sequence number (step 105), then generates an ATCP packet (step 106), and sends it to the back-end server (step 107).

Figure 6:
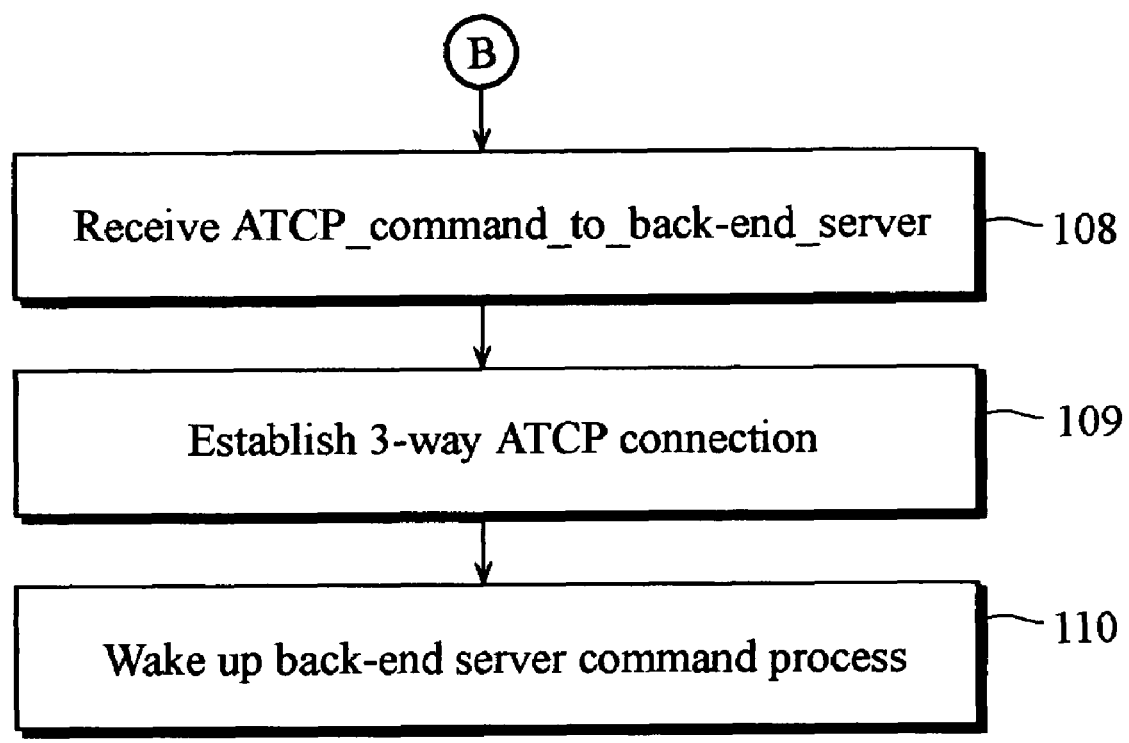
FIG. 6 is a flowchart of a software routine run at the back-end server upon receiving the ATCP_command_to_back-end_server packet from the front-end server.

FIG. 6 is a flowchart of a software routine run at the back-end server. The back-end server runs a back-end server command process for executing the command received from the front-end server through the data link (step 108). The software at the back-end server has an ATCP layer that sets up a 3-way ATCP connection (step 109) and wakes up the back-end server command process, which was blocked while waiting for a command from the front-end server (step 110).

Figure 7:
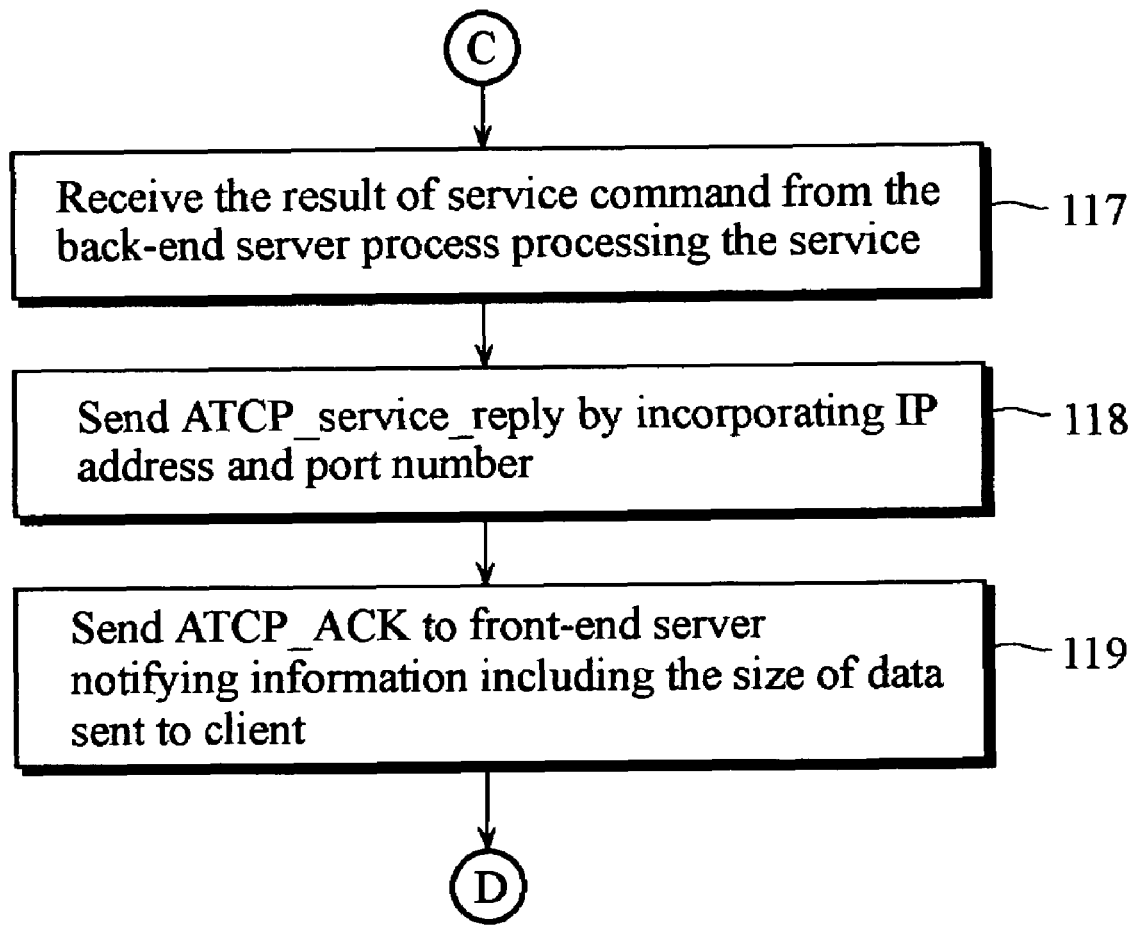
FIG. 7 is a flowchart of a software routine run at the back-end server before sending an ATCP_service_reply packet to the client and an ATCP_ACK packet to the front-end server.

FIG. 7 is a flowchart of a software routine run at the back-end server before sending ATCP_service 26 to the client and ATCP_ACK 27 to the front-end server (step 119). When the result of the service command is received from the back-end server command process (step 117), it is sent to the client by incorporating the IP address and port number of the front-end server (step 118).

Figure 8:
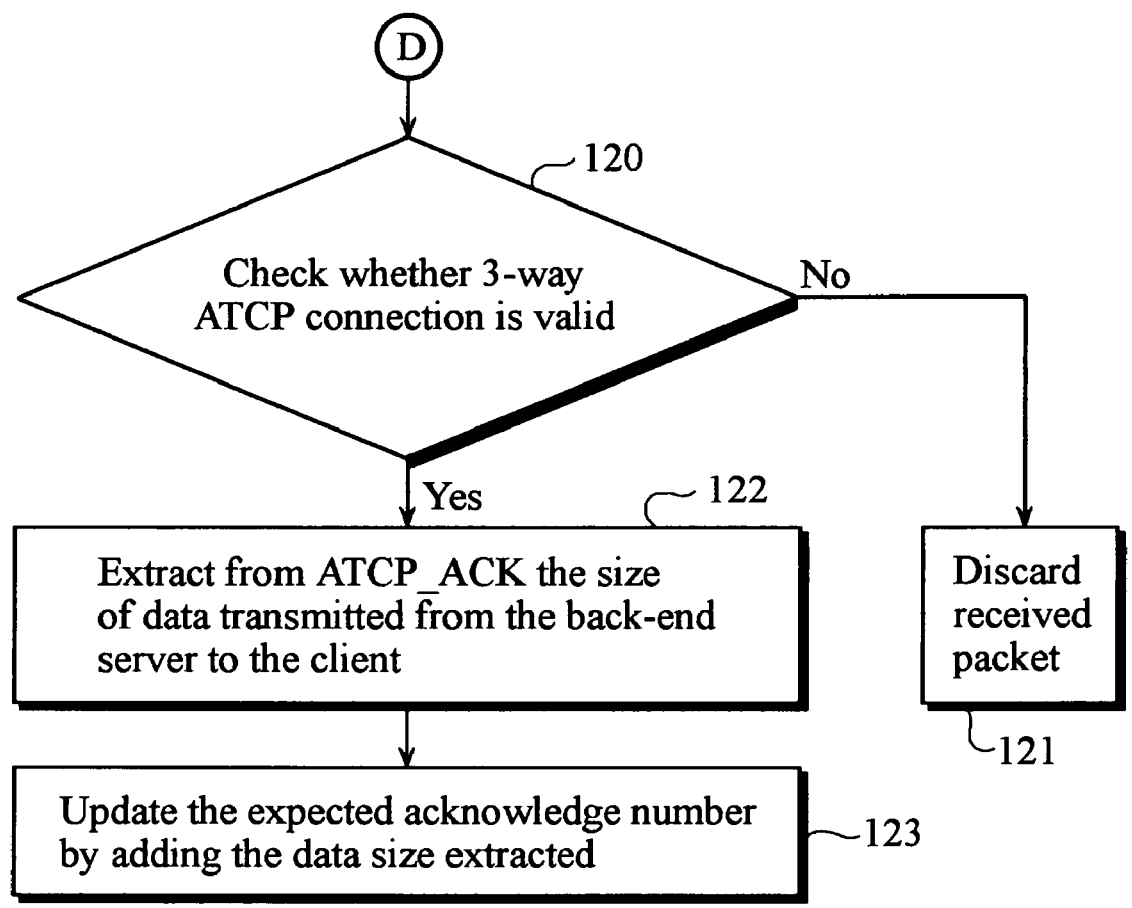
FIG. 8 is a flowchart of a software routine run at the front-end server upon receiving the ATCP_ACK packet from the back-end server.

FIG. 8 is a flowchart of a software routine run at the front-end server upon receiving ATCP_ACK 27 from the back-end server at the time indicated by Point D. The front-end server checks whether the ATCP connection is valid (step 120). If not valid, the received packet is discarded (step 121). If valid, the front-end server extracts the size of data transmitted by the back-end server to the client (step 122) and updates the expected acknowledgement by adding the data size (step 123).

Figure 9:
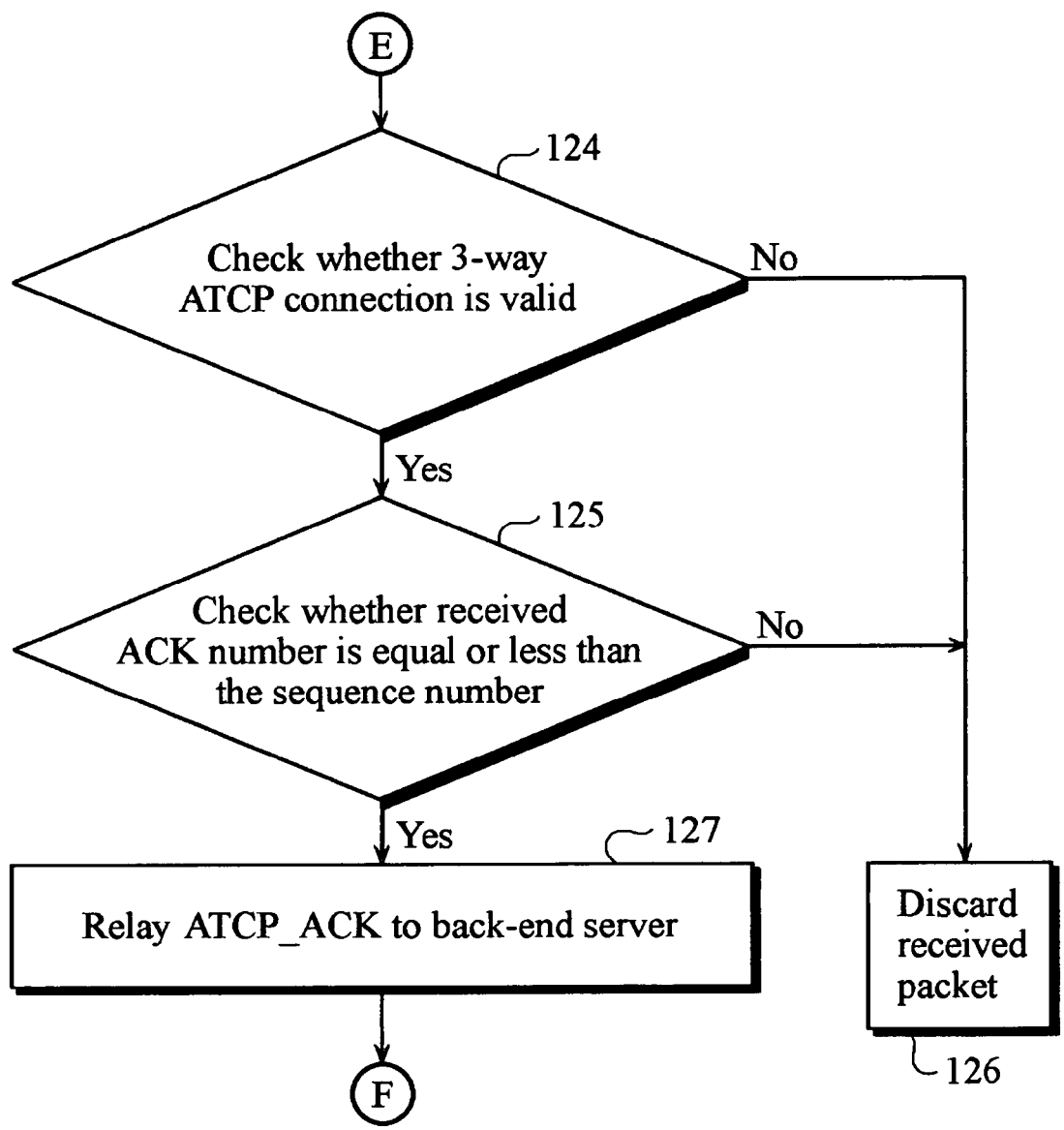
FIG. 9 is a flowchart of a software routine run at the front-end server upon receiving an ACK packet from the client.

FIG. 9 is a flowchart of a software routine run at the front-end server upon receiving ACK 28 from the client at the time indicated by Point E. The front-end server checks whether the ATCP connection is valid (step 124). If not valid, the received packet is discarded (step 126). If valid, whether the received ACK number is equal or less than the sequence number is checked (step 125). If the received ACK number is larger, the received packet is discarded (step 126). If the received ACK number is equal or less, the ATCP buffer is emptied by the received amount (step 127).

Figure 10:
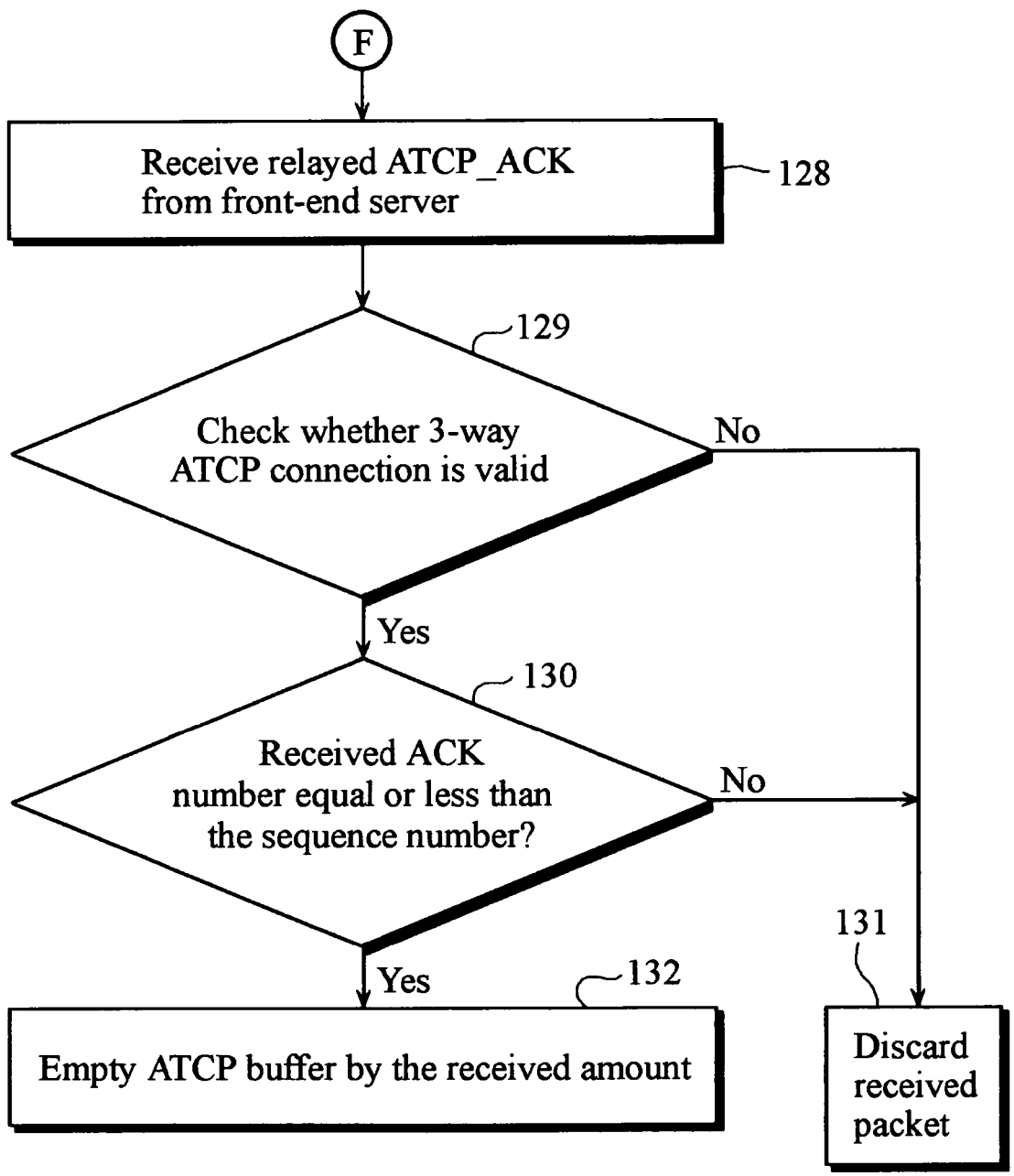
FIG. 10 is a flowchart of a software routine run at the back-end server upon receiving the ATCP_ACK packet from the front-end server.

FIG. 10 is a flowchart of a software routine run at the back-end server at receiving ATCP_ACK 29 that was relayed by the front-end server receiving ACK 28 from the client. Point F in FIG. 10 corresponds to point F in FIG. 9, the time when the back-end server received ATCP_ACK 29 from the front-end server.

Receiving the ATCP_ACK packet from the front-end server (step 128), the back-end server checks whether the ATCP connection is valid (step 129). If not valid, the received packet is discarded (step 131). If valid, whether the received ACK number is equal or less than the sequence number is checked (step 130). If the received ACK number is larger, the received packet is discarded (step 131). If the received ACK number is equal or less, the ATCP buffer is emptied by the received amount (step 132).

Figure 11:
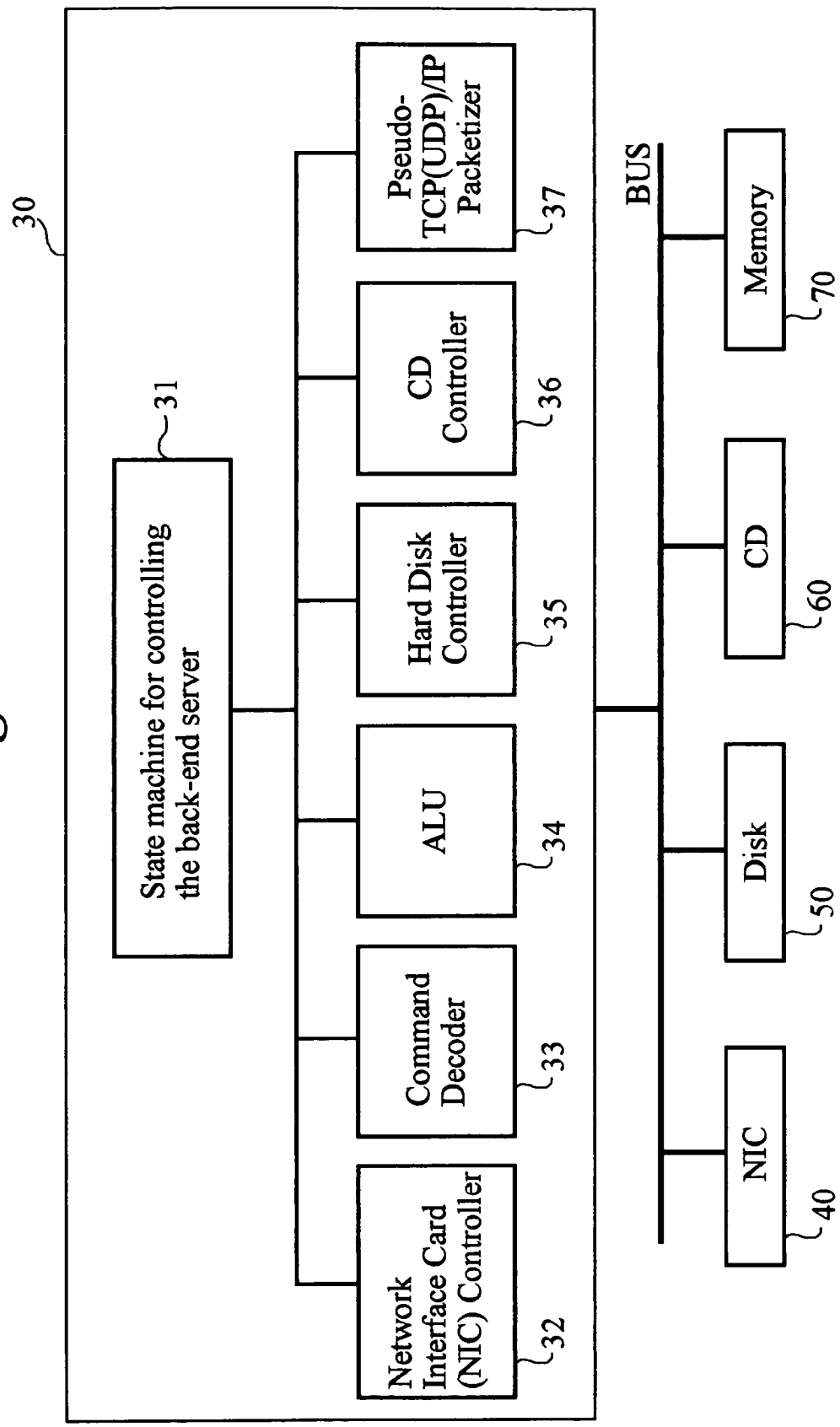
FIG. 11 is a block diagram for a back-end server that assembles a pseudo TCP packet.

FIG. 11 shows the back-end server which comprises a back-end server controller 30, an NIC(network interface card) 40, a disk 50, a CD 60 and memory 70. The NIC functions as an interface between the back-end server and the network cabling.

The back-end server controller 30 is preferably a program controlling various controlling operations in the back-end server. The back-end server controller 30 further comprises a state machine 31 for controlling the back-end server, a NIC controller 32, a command decoder 33, an ALU 34, a disk controller 35, a CD controller 36, and a pseudo TCP packetizer 37.

The NIC controller 32 is a program module for controlling receipt and transmission of packets from and to the network by reading and writing an NIC register. The command decoder 33 is a program module to decode the command from the front-end server included in the TCP packet received through the NIC. The ALU 34 performs arithmetic and logic operations necessary for performing a command. The disk controller 35 is a program module to control the input and output to and from the disk 50. The CD controller 36 is a program module to control the output from a CD from the CD 60. The pseudo TCP packetizer 37 assembles a pseudo TCP packet by making up the TCP header and the IP header to look like that the packet was sent by the front-end server.

Figure 12:
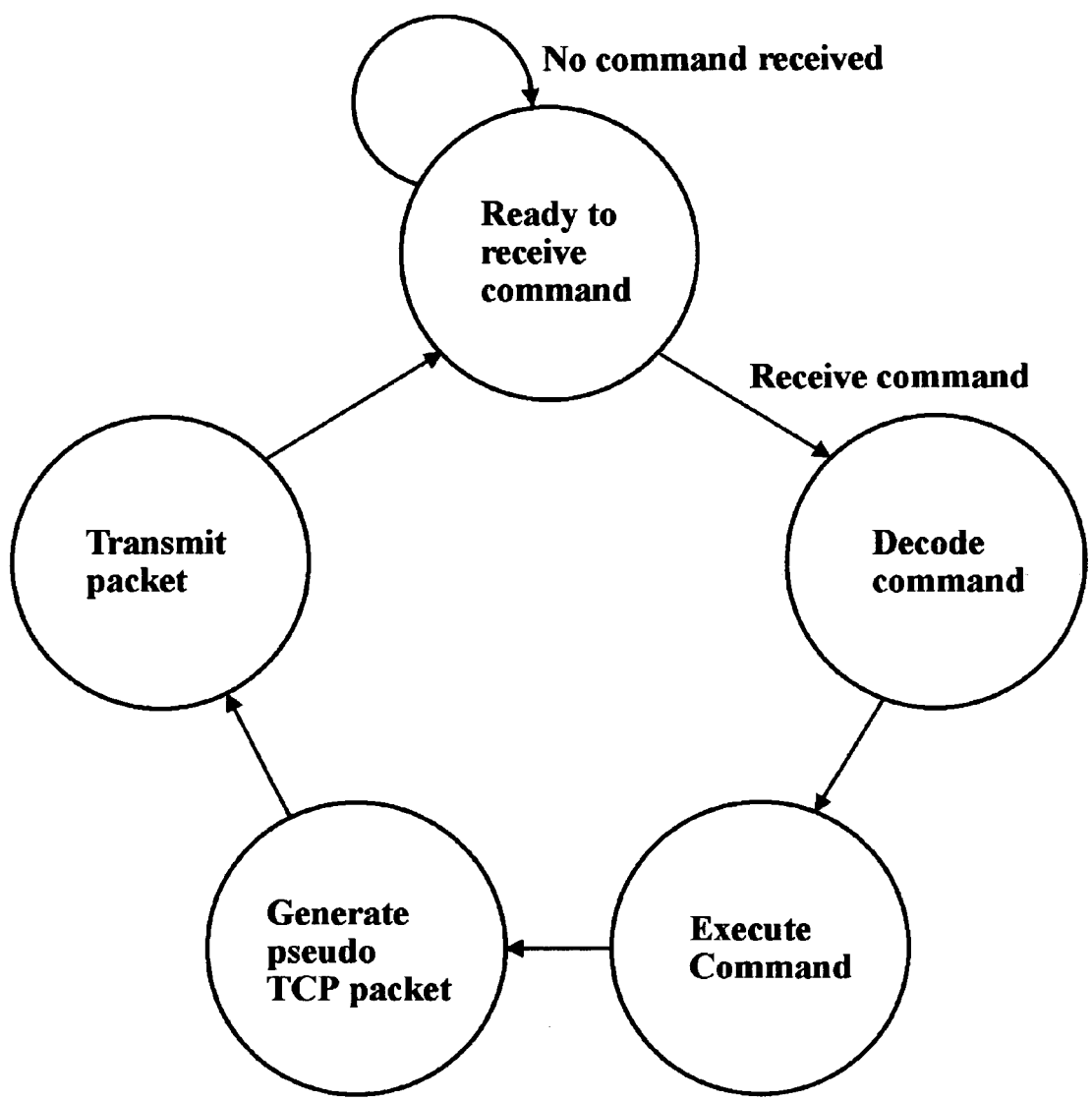
FIG. 12 is a state transition diagram of a state machine controlling the back-end server.

FIG. 12 is a state transition diagram of a state machine controlling the back-end server of the present invention. The back-end server is ready to receive a command from the front-end server through the NIC. When a command is received, the received command is decoded by the command decoder 33 to execute the command or to perform I/O. The result is incorporated by a pseudo TCP packetizer 37 into a pseudo TCIP/IP packet that looks like a packet sent by the front-end server. The above process is repeated.

The asymmetric 3-way TCP (ATCP) scheme of the present invention realizes an economic and scalable server system where the server distributes a client request to one or more back-end servers which perform the work and deliver the result to the client.

The ATCP scheme of the present invention can increase the performance of a web server by replacing the existing TCP layer with the ATCP layer so as to distribute the work among multiple back-end servers. For example, the existing web servers may be modified in such a way that the web servers that received the requests from clients may instructs the multiple back-end servers to perform the work and relate the work to the clients.

The presence of back-end servers is transparent to the client in that there is no need for a client to have any prior knowledge of back-end servers and there is no need to change the IP or the port address of the existing servers. Only the front-end server needs to have prior knowledge of the back-end servers.

Although the prevent invention was described in terms of a preferred embodiment using the TCP, an alternative embodiment is possible using the UDP (User Datagram Protocol), another transport-layer protocol offered as part of the TCP/IP suite. Whereas the TCP provides a connection-oriented service where a connection is established first before packets are sent in a continuous stream, the UDP provides a connectionless service where individual datagrams are sent without first establishing a connection. The UDP is typically used where guaranteed delivery is not critical, such as video or audio transmission.

In the alternative embodiment, similar to the pseudo TCP packet, the front-end servers sends to the back-end server the UDP header information (the front-end server's UDP port number and the client's UDP port number) and the IP header information (the front-end server's IP address and the client's IP address). The back-end server then assembles a pseudo UDP/IP packet using the information received.

While the invention has been described with reference to preferred embodiments, it is not intended to be limited to those embodiments. It will be appreciated by those of ordinary skilled in the art that many modifications can be made to the structure and form of the described embodiments without departing from the spirit and scope of this invention.

For example, the preferred embodiment of the present invention was described with respect to a web server, but those skilled in the art will appreciate that the same technique can be applied to other kinds of servers such as a DB server, a file server, a mail server, a firewall server and a printer server.

What is claimed is:

1. A server system for processing a service request from a client in a network processing environment, comprising:
    a front-end server for receiving a service request from the client and for generating a data link frame containing a service command necessary to perform the service request; and
    at least one back-end server connected to the front-end server through a data link, without establishing a transmission control protocol/Internet protocol (TCP/IP) connection, for executing the service command in the data link frame received from the front-end server through the data link and for sending a result of the service command to the client bypassing the front-end server in a pseudo packet that would be recognized by the client as a packet originating from the front-end server.

2. The system of claim 1, wherein said pseudo packet contains an IP address and a port number corresponding to the front-end server.

3. The system of claim 2, wherein said pseudo packet is a pseudo TCP packet containing a TCP header.

4. The system of claim 2, wherein said pseudo packet is a pseudo user datagram protocol (UDP) packet containing a UDP header.

5. The system of claim 1, wherein the front-end server is a database (DB) server.

6. The system of claim 1, wherein the front-end server is a file server.

7. The system of claim 1, wherein the front-end server is a mail server.

8. The system of claim 1, wherein the front-end server is a printer server.

9. The system of claim 1, wherein the front-end server is a firewall server.

10. The system of claim 1, wherein the back-end server further comprises:
    a state machine for controlling packet generation and transmission;
    a command decoder for decoding a command received from the front-end server;
    a pseudo packetizer for assembling said pseudo packets;
    a network interface card (NIC) controller for controlling an NIC;
    a disk controller for controlling a disk;
    a compact disk (CD) controller for controlling an output from a CD; and
    a memory controller for controlling memory.

11. An asymmetric 3-way TCP system for processing a service request from a client in a network processing environment, comprising:
    a client issuing a service request;
    a front-end server for receiving the service request from the client and for generating a data link frame containing a service command necessary to perform the service request; and
    at least one back-end server connected to the front-end server, without establishing a TCP/IP connection, through a data link for receiving the service command contained in the data link frame from the front-end server through the data link and for sending a result of the service command to the client bypassing the front-end server in a packet containing a TCP header and an IP header that would be recognized by the client as a TCP packet originating from the front-end server, without modifying a port number included in the packet, wherein the port number is expected by the client.

12. An asymmetric 3-way UDP system for processing a service request from a client in a network processing environment, comprising:
- a client issuing a service request;
- a front-end server for receiving the service request from the client and for generating a data link frame containing a service command necessary to perform the service request; and
- at least one back-end server connected to the front-end server through a data link, without establishing a TCP/IP connection, for receiving the service command contained in the data link frame from the front-end server through the data link frame and for sending a result of the service command to the client bypassing the front-end server in a packet containing a UDP header and an IP header that would be recognized by the client as a UDP packet originating from the front-end server.

13. A method for processing a service request from a client in a network processing environment, comprising the steps of:
- receiving a service request from the client by a front-end server;
- generating a data link frame containing a command necessary to perform the service request to a back-end server connected to the front-end server, without establishing a TCP/IP connection, through a data link;
- executing the command contained in the data link frame received through the data link by the back-end server;
- assembling, by the back-end server, a pseudo packet bearing a result of the command that would look like a packet originating from the front-end server; and
- sending the pseudo packet by the back-end server to the client bypassing the front-end server.

14. The system of claim 13, wherein said pseudo packet is a pseudo TCP packet containing a TCP header.

15. The system of claim 13, wherein said pseudo packet is a pseudo UDP packet containing a UDP header.

16. A computer-readable medium containing a computer program which can be run in a computer to perform the steps of:
- receiving a service request from a client;
- generating, by the front-end server, a command necessary to perform the service request and sending the command to a back-end server connected to the front-end server, without establishing a TCP/IP connection, through a data link;
- executing the command by the back-end server;
- assembling a pseudo packet bearing a result of the command that would look like a packet originating from the front-end server by the back-end server; and
- sending the pseudo packet by the back-end server to the client bypassing the front-end server.

17. The computer-readable medium of claim 16, wherein said pseudo packet is a pseudo TCP packet containing a TCP header.

18. The computer-readable medium of claim 16, wherein said pseudo packet is a pseudo UDP packet containing a UDP header.

19. The computer-readable medium of claim 16, wherein the medium is a CD.

* * * * *